United States Patent
Sharp et al.

(10) Patent No.: US 7,721,555 B2
(45) Date of Patent: May 25, 2010

(54) GAS TURBINE WITH FREE-RUNNING GENERATOR DRIVEN BY BY-PASS GAS FLOW

(75) Inventors: John Sharp, Dachau (DE); Andreas Kreiner, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 968 days.

(21) Appl. No.: 10/587,822

(22) PCT Filed: Jan. 29, 2005

(86) PCT No.: PCT/DE2005/000137
§ 371 (c)(1),
(2), (4) Date: Jul. 28, 2006

(87) PCT Pub. No.: WO2005/073519
PCT Pub. Date: Aug. 11, 2005

(65) Prior Publication Data
US 2007/0169462 A1 Jul. 26, 2007

(30) Foreign Application Priority Data
Jan. 31, 2004 (DE) .................. 10 2004 004 945

(51) Int. Cl.
*F02C 6/00* (2006.01)
(52) U.S. Cl. ........................ 60/802; 60/226.1
(58) Field of Classification Search .............. 60/226.1, 60/801, 802; 290/52
See application file for complete search history.

(56) References Cited

U.S. PATENT DOCUMENTS

| 2,853,638 | A | | 3/1958 | Bonnano et al. ............ 310/154 |
| 4,309,621 | A | * | 1/1982 | Litz ............................. 290/52 |
| 5,376,827 | A | | 12/1994 | Hines ........................... 290/52 |
| 7,484,354 | B2 | * | 2/2009 | Stretton ..................... 60/226.1 |
| 2002/0122723 | A1 | | 9/2002 | Care et al. ...................... 416/3 |
| 2005/0039437 | A1 | * | 2/2005 | Lair ............................. 60/204 |
| 2005/0150204 | A1 | * | 7/2005 | Stretton et al. ............. 60/39.83 |
| 2007/0157597 | A1 | * | 7/2007 | Sharp ......................... 60/226.1 |
| 2008/0120980 | A1 | * | 5/2008 | Gemin et al. ................. 60/802 |
| 2008/0265580 | A1 | * | 10/2008 | Sharp ........................... 290/52 |

FOREIGN PATENT DOCUMENTS

DE   41 31 713 C2   4/1993
GB   1 174 969      12/1969

* cited by examiner

*Primary Examiner*—Michael Cuff
*Assistant Examiner*—Phutthiwat Wongwian
(74) *Attorney, Agent, or Firm*—Davidson, Davidson & Kappel, LLC

(57) ABSTRACT

A gas turbine, especially an aircraft engine is provided. The gas turbine comprises at least one compressor (15, 16), at least one combustion chamber (17), at least one turbine (18, 19), and at least one generator (20) for generating electrical energy, each generator (20) comprising at least one stator (25) and at least one rotor (22). Each rotor (22) of each generator (20) is embodied as a free-wheeling generator turbine that is driven by a gas flow in such a way that it rotates in relation to the respective stator (25) of the respective generator (20) and thus generates electrical energy from the kinetic energy of the gas flow.

10 Claims, 2 Drawing Sheets

GAS TURBINE WITH FREE-RUNNING GENERATOR DRIVEN BY BY-PASS GAS FLOW

FIELD OF THE INVENTION

The present invention relates to a gas turbine, in particular an aircraft engine comprising at least one compressor, at least one combustion chamber, at least one turbine, and at least one generator for generating electrical energy.

BACKGROUND

In addition to a thrust for propelling the aircraft, aircraft engines—either civil aircraft engines or military aircraft engines—generate power for supplying attachments or auxiliary units of the gas turbine or for supplying aircraft-side systems such as the air conditioning system. The attachments, auxiliary units, or also aircraft-side systems of an aircraft engine may be devices, units, or systems driven hydraulically, pneumatically, or electrically or by an electric motor.

A clear trend toward increasing need for electrical power in the aircraft can be noticed in aircraft development. This is based on the fact that hydraulically or pneumatically driven aircraft systems are replaced by systems driven by electric motors and that an ever greater power demand exists per aircraft seat. Therefore, the aircraft engines must provide an ever greater amount of electrical power. Such aircraft engines are also referred to as "more electric engines", (MEE).

For generating electrical power for supplying the attachments or auxiliary units of the gas turbine as well as the aircraft-side systems it is known from the related art to draw mechanical energy from a core engine of the gas turbine which is used for driving pumps and generators, for example. DE 41 31 713 C2 describes an aircraft engine in which shaft energy is drawn from a core engine and this shaft energy is supplied to auxiliary units.

SUMMARY OF THE INVENTION

An object of the present invention is to provide a novel gas turbine, in particular a novel aircraft engine.

In an advantageous embodiment of the present invention, the or each rotor of the or each generator is designed as a free-running generator turbine which, driven by a gas flow, rotates relative to the respective stator of the respective generator thereby generating electrical energy from the kinetic energy of the gas flow. This results in a totally novel concept or principle for the configuration of a gas turbine designed as a "more electric engine."

According to an advantageous refinement of the present invention, the gas turbine includes a fan module having at least one fan, the or each generator being positioned downstream from the or each fan in such a way that the or each free-running generator turbine of the or each generator is driven by a gas flow of the or each fan. The or each generator generates electrical energy from a bypass gas flow of the fan module. The or each generator is preferably integrated into a generator module, the generator module being detachably connected to the fan module at the downstream end of a fan flow channel.

According to an alternative advantageous refinement of the present invention, the or each generator is positioned downstream from a low-pressure turbine of the gas turbine, kinetic energy of the gas flow exiting the low-pressure turbine being converted into electrical energy. It is also possible to position a generator downstream from the fan module and an additional generator downstream from the low-pressure turbine of the gas turbine whereby kinetic energy of the bypass gas flow exiting the fan module and kinetic energy of the gas flow exiting the low-pressure turbine is converted into electrical energy.

BRIEF DESCRIPTION OF THE DRAWINGS

Without being restricted thereto, exemplary embodiments of the present invention are explained in greater detail based on the drawing.

DETAILED DESCRIPTION

The present invention is described in greater detail in the following with reference to FIG. 1.

Figure 1:
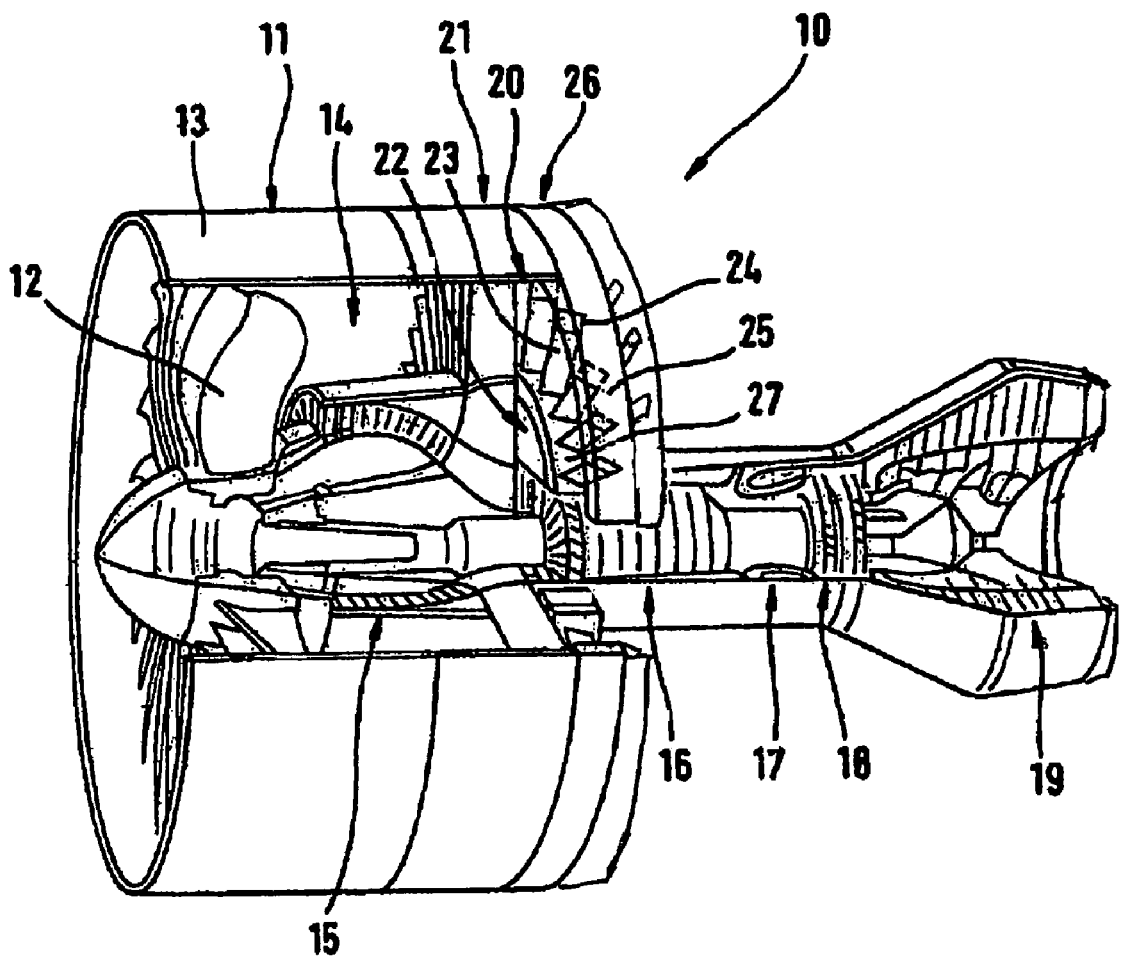
FIG. 1 shows a schematic representation of a gas turbine according to the present invention.
Figure 2:
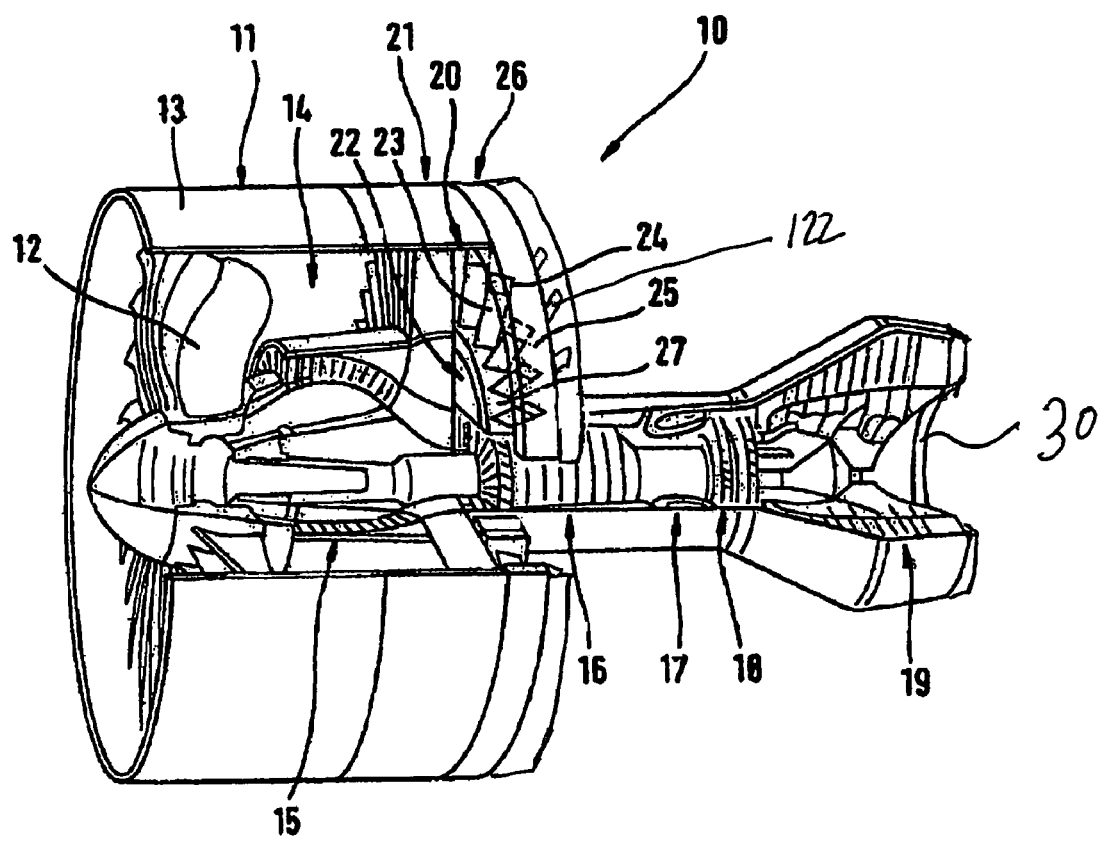
FIG. 2 shows an alternate embodiment of the present invention.

FIG. 1 shows a gas turbine 10 designed as an aircraft engine in a partial sectional perspective side view. Gas turbine 10 of FIG. 1 has a fan module 11 including a rotating fan 12, fan 12 being enclosed by housing 13 of fan module 11. A fan flow channel 14 is adjacent downstream from fan 12. Fan 12 acts as a low-pressure compressor; a medium-pressure compressor 15, a high-pressure compressor 16, a combustion chamber 17, a high-pressure turbine 18, and a low-pressure turbine 19 are adjacent downstream from fan 12. Medium-pressured compressor 15, high-pressure compressor 16, combustion chamber 17, high-pressure turbine 18, and low-pressure turbine 19 together form the core engine of gas turbine 10. One part of the gas flow generated by fan 12 which acts as a low pressure compressor reaches the core engine and another part reaches fan flow channel 14. The portion of the gas flow generated by fan 12 and reaching fan flow channel 14 is referred to as a bypass gas flow.

Within the scope of the present invention at least one generator is assigned to the gas turbine for generating electrical power, one rotor of each generator being designed as a free-running generator turbine, and the rotor, driven by a gas flow, rotating relative to a stator of the respective generator, thereby generating electrical energy from the kinetic energy of the gas flow.

In the preferred exemplary embodiment of FIG. 1, a generator 20 is assigned to gas turbine 10, generator 20 being integrated into a generator module 26 and the generator module 26 being positioned at the downstream end 21 of fan module 11 or fan flow channel 14. In the preferred exemplary embodiment of FIG. 1, a rotor 22 of generator 20 designed as a free-running generator turbine is thus driven by the bypass gas flow of fan module 11, and generator 20 generates electrical energy from the kinetic energy of the bypass gas flow of fan module 11. As is apparent in FIG. 1, rotor 22 of generator 20 has multiple rotating blades 23, pole pieces 24 being assigned to radially outlying ends of blades 23. Rotor 22 of generator 20, which is formed by blades 23 and pole pieces 24, is enclosed radially outside by a stator 25 of generator 20, stator 25 having windings and magnetic circuits for generating electrical energy.

At the radially inside end, blades 23 of rotor 22 are mounted on an outer rotating bearing ring 27 of a pivot bearing. Like the entire generator module 26, the bearing is thus positioned downstream from fan module 11 and operates therefore in a relatively cold and a relatively clean environment.

In the preferred exemplary embodiment of the present invention, generator module 26 having generator 20 is detachably connected to fan module 11. An outside diameter of generator module 26 is adapted to the outside diameter of fan module 11 in such a way that generator module 26 does not radially protrude with respect to fan module 11. Generator module 26 may be connected to fan module 11 using a plurality of fastening means, in particular locking bolts or V-clamps. The detachable connection of generator module 26 to fan module 11 ensures that generator module 26 may be disassembled from fan module 11 in a simple manner for maintenance work.

In the exemplary embodiment of FIG. 1, generator 20 of generator module 26 has a single-stage design, i.e., it has one rotor 22 with multiple blades 23 assigned to rotor 22. However, within the scope of the present invention, a generator may also be used which includes multiple rotors, including rotor 122, designed as free-running generator turbines and which has thus a multi-stage design. The multiple rotors designed as free-running generator turbines may rotate either in the same direction or in opposite directions.

As mentioned above, rotor 22 of generator 20 has multiple blades 23 rotating with rotor 22. Rotor 22 has a smaller number of blades than fan 12 of fan module 11. This results in rotor 22 of generator 20 being largely insensitive to bird strikes or hail.

In the simplest form of generator 20, blades 23 of rotating rotor 22 are designed to be stationary, which means that the bypass gas flow of fan module 11 flows against blades 23 always at the same angle of incidence. However, it is also possible within the scope of the present invention to design blades 23 of rotor 22 to be adjustable. This makes it possible to adjust the angle of incidence of blades 23 in such a way that the output energy of generator 20 is adapted to the operating conditions of gas turbine 10, thereby making it possible to extract an optimum amount of energy from the bypass gas flow of fan module 11 and to generate a higher amount of electrical energy. The efficiency of generator 20 may thus be increased.

The design of gas turbine 10 according to the present invention described in connection with FIG. 1 has the advantage that, for generating electrical energy with the aid of generator 20, the configuration of gas turbine 10, in particular the configuration of a core engine of gas turbine 10, does not have to be modified. The design principles for generating electrical energy in a gas turbine, known from the related art, all have in common that shaft energy is drawn from the core engine of the gas turbine. The present invention abandons this principle and proposes a gas turbine 10 having generator 20 which generates electrical energy from a gas flow, from the bypass gas flow of fan module 11 in particular. This has the advantage that generator 20 operates in a relatively clean and relatively cold environment. Generator 20 virtually does not have to be cooled. Moreover, no design modifications to the core engine of the gas turbine are necessary.

In contrast to the exemplary embodiment shown it is possible of course to assign the pole pieces of rotor 22 to the radially inside ends of blades 23. In this case, the stator of the generator would not be positioned radially outside with respect to rotor 22, but rather radially inside. In this case, the rotor would thus enclose the stator of the generator radially on the outside.

It should be pointed out here that generator 20 of the exemplary embodiment in FIG. 1 may also be used in motor mode. This may be useful, for example, when an aircraft having such gas turbines is in a parked position and rotation of fan 12 due to the effects of wind is to be prevented. It is furthermore possible, when generator 20 is driven in the motor mode, to generate a negative pressure at the outlet of fan 12 in order to enable a more effective acceleration of fan 12.

In contrast to the exemplary embodiment shown in FIG. 1, it is also possible to position a generator, which has a rotor designed as a free-running generator turbine, downstream from low pressure turbine 19. In this case, the rotor would be driven from the gas flow exiting low pressure turbine 19 and electrical energy would then be generated from the kinetic energy of the gas flow exiting low pressure turbine 19. In this case, the generator would only have to be designed for use in higher temperature ranges.

It is likewise possible to position a first generator downstream from fan module 11 and an additional generator 30 downstream from low pressure turbine 19. In this case, electrical energy would be generated from both the kinetic energy of the bypass gas flow of fan modula 11 as well as from the kinetic energy of the gas flow exiting low pressure turbine 19.

However, the system shown in FIG. 1 is preferred in which generator 20 is positioned downstream from fan module 11 and is integrated into a generator module 26 designed as a separate assembly, generator module 26 being detachably connected to fan module 11. Using such a generator, it is possible to generate several hundred kilowatts of electrical energy during normal operation of gas turbine 10. During what is known as "engine windmilling", generator 20 is able to generate electrical emergency energy of approximately 30 kW.

The principle according to the present invention for providing a "more electric engine", may be used in a plurality of aircraft engines, e.g., in turboprop engines, in aircraft engines having a high bypass gas flow of the fan module which is typical in civil aircraft engines, in aircraft engines having a low bypass gas flow which is typical in military aircraft engines, or also in engines which are used in helicopters.

What is claimed is:

1. A gas turbine comprising:
   at least one compressor;
   at least one combustion chamber;
   at least one turbine; and
   at least one generator for generating electrical energy, the at least one generator including at least one rotor and at least one corresponding stator, the at least one rotor being a free-running generator turbine which, driven by a gas flow, rotates relative to its corresponding stator and generates electrical energy from the kinetic energy of the gas flow; and
   a fan module having at least one fan and a fan flow channel, a part of the gas flow from the fan module passing to the at least one compressor and another part of the pass flow passing to the fan flow channel and bypassing the at least one compressor to define a bypass gas flow, the at least one generator being positioned downstream from the at least one fan such that the at least one generator is driven by the bypass gas flow.

2. The gas turbine as recited in claim 1, wherein the at least one rotor includes a plurality of rotors.

3. The gas turbine as recited in claim 2, wherein the at least one generator is integrated into a generator module, the generator module being detachably connected to the fan module.

4. The gas turbine as recited in claim 1, wherein the at least one rotor has multiple rotating blades, each blade being assigned a corresponding pole piece.

5. The gas turbine as recited in claim 4, wherein the pole pieces are assigned to radially outside ends of the rotating blades of the or each rotor, the at least one corresponding stator radially enclosing its rotor.

6. The gas turbine as recited in claim 4, wherein in that the pole pieces are assigned to radially inside ends of the rotating blades of the or each rotor, the at least one rotor radially enclosing its corresponding stator.

7. The gas turbine as recited in claim 1, wherein the at least one rotor has a smaller number of blades than the or each fan of the fan module.

8. The gas turbine as recited in claim 2, wherein the at least one generator has multiple generator stages, each generator stage including one of the plurality of rotors.

9. The gas turbine as recited in claim 1, wherein the blades of the at least one rotor are adjustable for adjusting the angle of incidence of the blades.

10. The gas turbine as recited in claim 1, wherein the at least one generator includes a first generator and a second generator, the first generator being positioned downstream from the fan module and the second generator being positioned downstream from a low pressure turbine, and wherein kinetic energy of the gas flow exiting the fan module and kinetic energy of the gas flow exiting the low pressure turbine are converted into electrical energy.

* * * * *